United States Patent [19]

Klapproth et al.

[11] Patent Number: 4,856,963
[45] Date of Patent: Aug. 15, 1989

[54] STATOR ASSEMBLY FOR AN AXIAL FLOW ROTARY MACHINE

[75] Inventors: Kenneth H. Klapproth, Middletown; William C. Blimmel, West Hartford; Merle L. Dinse, South Windsor, all of Conn.

[73] Assignee: United Technologies Corporation, Hartford, Conn.

[21] Appl. No.: 172,038

[22] Filed: Mar. 23, 1988

[51] Int. Cl.$^4$ ............................................. F04D 29/54
[52] U.S. Cl. ..................................... 415/190; 415/189
[58] Field of Search ............... 415/189, 190, 191, 208, 415/209, 210, 216, 217, 218, 115

[56] References Cited

U.S. PATENT DOCUMENTS

| 3,104,041 | 9/1963 | Vivian | 415/190 |
| 4,194,869 | 3/1980 | Corcokios | 415/189 |
| 4,391,565 | 7/1983 | Speak | 415/190 |
| 4,632,634 | 12/1986 | Vinciguerra et al. | 415/189 |
| 4,648,792 | 3/1987 | Baran, Jr. et al. | 415/218 |
| 4,687,413 | 8/1987 | Prario | 415/190 |

Primary Examiner—Robert E. Garrett
Assistant Examiner—John T. Kwon

[57] ABSTRACT

A stator assembly 14 includes an annular support structure, such as an outer case 24, and an element, such as a stator vane assembly 30. The stator vane assembly is restrained against circumferential movement by a key 58 integral with the stator vane which engages the outer case. Various construction details, including a radial projection 82 on the key, are developed which improve the fatigue life of the support structure and enhance the ease of assembly of the structure. In one method of assembling the structure, the method includes the step of using the radial projection on the key as an alignment device.

11 Claims, 3 Drawing Sheets

STATOR ASSEMBLY FOR AN AXIAL FLOW ROTARY MACHINE

DESCRIPTION

1. Technical Field

This invention relates to an axial flow rotary machine and, in particular, to a stator assembly having a device for restraining an annular element against circumferential movement.

The concepts were developed for use in the turbine and compressor section of aircraft gas turbine engines but have application to rotary machines in other fields.

2. Background of Invention

One example of an axial flow rotary machine is a gas turbine engine used for powering an aircraft. The engine principally includes a stator assembly and a rotor assembly. An annular flow path for the working medium gases extends axially through the engine between the rotor assembly and the stator assembly.

The stator assembly includes an outer case and rows of stator vanes which extend inwardly from the outer case across the working medium flow path. The rotor assembly includes a rotor and rows of rotor blades which extend alternately with the rows of stator vanes. Each row or array of rotor blades extends outwardly across the working medium flow path into close proximity with the outer case. An outer air seal extends circumferentially about the interior of the outer case outwardly of the rotor blades to bound the flow path. The outer air seal is formed of a plurality of segments. Each segment has an abradable surface, such as metal honeycomb material, which accepts rubbing contact between the rotor blade and the outer air seal during transient operations of the engine.

As the working medium gases are flowed along the flow path, the gases exert a force on the stator vanes which acts in the axial direction and in the counterclockwise circumferential direction (as viewed from the front of the engine). As the gases are flowed from the row of stator vanes and enter the adjacent row of rotor blades, the outer air seal is subjected to a force which acts in the axial direction and in the clockwise direction or opposite to the circumferential force on the vanes.

Because of the circumferential forces, an anti-rotation device is used to prevent movement of the stator vanes and the outer air seal segments in the circumferential direction. An example of such a construction is shown in U.S Pat. No. 4,687,413 issued to Aldo Prario entitled "Gas Turbine Engine Assembly". In this particular construction, a C-shaped coupling is used as a key which engages a rail to restrain a stator vane assembly and the adjacent outer air seal against circumferential movement. The C-shaped coupling overlaps the rear foot of the stator vane and the rail to slidably engage the stator vane, the outer air seal and the rail. The coupling is trapped axially between the rail and an outer air seal.

Another example of an anti-rotation device is the prior art construction shown in U.S. Pat. No. 4,687,413 which uses pins integral with the outer case to restrain an array of stator vanes. Although such pins are expensive to machine, the pins have the advantage of being positively secured against loss into the flow path.

In modern constructions a resilient insulation blanket formed of ceramic fibrous insulation covered with a metallic foil is disposed between the vane and the outer case to shield the outer case from gases flowing through the interior of the engine. As the vane is assembled to the casing, an additional force must be applied to the vane, such as by striking the vane to overcome frictional forces which resist seating the vane and to compress a section of the resilient insulation. It is necessary to correctly align the vane so that the sudden force applied to the vane does not damage sections of the vane that are weak in shear. Thus, it is also important to provide a tool to the stator vane assembly which aids in aligning the device during assembly when increased forces are applied to the vane.

Accordingly, scientists and engineers working under the direction of Applicants' assignee have sought to develop an anti-rotation device which would: positively restrain flow path segments, such as a stator vane assembly or an air outer seal, against circumferential movement; reduce the complexity of the design; positively retain the anti-rotation device against loss to the flow path; and, provide an alignment device during assembly.

DISCLOSURE OF INVENTION

This invention is in part predicated on the recognition that the force couple acting on a key used to circumferentially restrain both a stator vane and an outer air seal can dislodge the key and cause the anti-rotation key to enter the flow path. It is also predicated on recognizing the circumferential shearing force exerted by such a key against a case rail can exceed allowable stresses in the rail because of the size of the bearing area of the key on the rail and because of the force couple from the vane and outer air seal twisting the key in the slot.

According to the present invention, a stator assembly for a gas turbine engine of the type having an array of stator vanes and an annular support structure adapted by an axially extending slot to engage an anti-rotation device includes a stator vane having an axially extending key integral with the vane which engages a slot in the support.

In accordance with one embodiment, the key has a radial projection extending toward the support which increases the area of the key facing in the circumferential direction.

In one embodiment of the present invention, an array of outer air seal segments are next to the array of stator vanes and the key of each associated vane extends axially beyond the slot in the case to engage the adjacent outer air seal segment.

According to the present invention, a method for assembling a stator vane to a stator support structure includes the step of forming a stator vane assembly having an integral anti-rotation key and forming the key with a radial projection which provides an alignment tool during assembly of the vane to the casing.

A primary feature of the present invention is a stator vane assembly having an anti-rotation key which extends axially and which is integral with the vane. The term "integral" means that the key and vane act as one piece; the key may be cast with the vane or separately formed and attached to the vane such as by bonding or by a mechanical fastener. Another feature is an annular support structure, such as an outer case, having an annular rail. The rail has a plurality of slots spaced circumferentially about the rail which adapt the rail to engage a key on each vane. In one embodiment, the key has a radial projection which extends into the slot in the assembled condition to increase the cross-sectional area of the key. The key includes a section extending away from the vane and beyond the slot which adapts the key to engage an adjacent segment of an outer air seal. The outer air seal overlaps the vane and the rail to shield the rail from the hot gases of the medium working flow path.

A primary advantage of the present invention is the durability of the engine which results from making the key integral with the stator vane to positively retain the key against loss and to enable the axial vane force to resist the turning or twisting movement applied to the key by the circumferential vane force. In one embodiment, a further advantage is the fatigue life of the rail which results from shielding the rail from the hot gases of the working medium flow path with the vane and with the outer air seal. In one embodiment, an advantage is the increase in fatigue life of the rail which results from increasing the circumferential bearing area of the key with a radial projection. Another advantage is the ease of assembly which results from using the radial projection on the key to align the vane during installation and using one key to lock both a stator vane assembly and an outer air seal.

The foregoing features and advantages of the present invention will become more apparent in light of the following detailed description of the best mode for carrying out the invention and in the accompanying drawings.

BEST MODE FOR CARRYING OUT THE INVENTION

Figure 1:
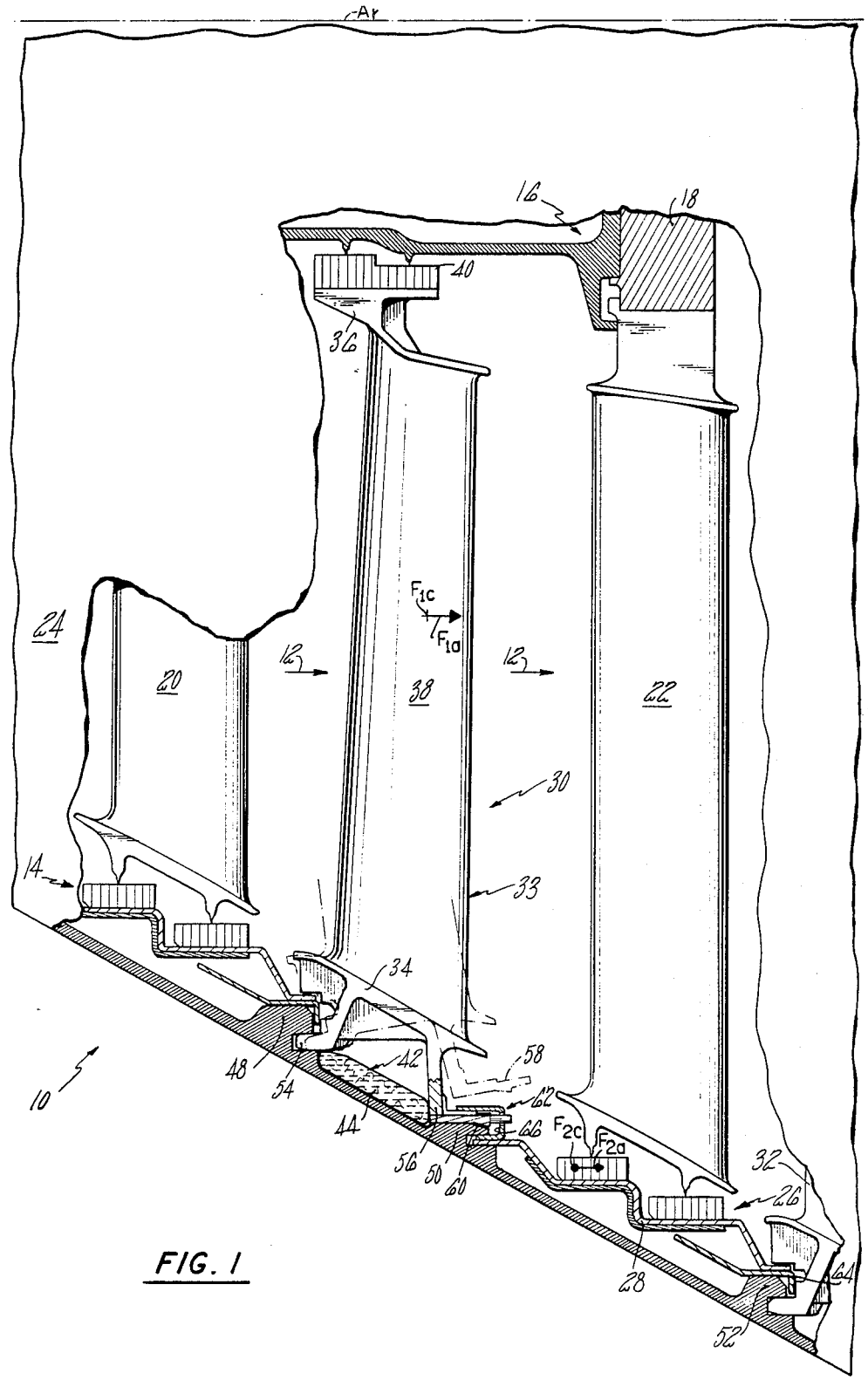
FIG. 1 is a simplified cross-sectional view taken through the turbine section of a gas turbine engine showing a support structure such as an outer case and an array of stator vane assemblies extending inwardly from the outer case.

FIG. 1 shows a portion of the turbine section 10 of an axial flow rotary machine, such as a gas turbine engine. The engine has an axis of symmetry $A_r$ and an annular flow path 12 for hot, working medium gases which extends axially through the engine. These gases move at high velocities and pressures through the turbine section.

The engine includes a stator assembly 14 and a rotor assembly 16. The rotor assembly includes rotor disks, as represented by the rotor disk 18. An array or row of rotor blades is attached to each disk, as represented by the rotor blade 20 and the rotor blade 22, radially outwardly across the working medium flow path and into proximity with the stator assembly.

The stator assembly 14 includes an annular support structure, such as an outer case 24, which extends circumferentially about the axis of symmetry to bound the working medium flow path 12. An annular element, such as an outer air seal 26, is disposed radially outwardly of the rotor blades to block the flow of working medium gases around the tips of rotor blades and to shield the outer case from the hot gases. Each outer air seal includes a plurality of arcuate outer air seal segments as represented by the outer air seal segment 28.

Other annular elements bounding the flow path, are arrays of arcuate stator vane assemblies which are disposed circumferentially about the interior of the outer case. These are represented by the stator vane assembly 30 and the stator vane assembly 32. One material for the stator vane assembly is AMS 5391, a nickel base alloy. The stator vane assembly is shown in phantom to show the vane's position during assembly.

Each stator vane assembly 30 includes a stator vane 33 having an inner platform 34 and an outer platform 36. One or more airfoils 38 extend radially across the working medium flow path between the platforms. An inner air seal 40 is attached to the outer platform and extends circumferentially in close proximity to the rotor assembly.

A resilient insulation blanket 42 is trapped between the stator vane 30 and the outer case 24. The resilient blanket includes an inner layer 44 of ceramic fibrous insulation and an outer metal foil layer 46 which positions the blanket between the vane and the outer case.

The outer case 24 has a plurality of axially spaced rails or case flanges as represented by the upstream rail 48, the downstream rail 50 and the adjacent rail 52. One satisfactory material for the rail is AMS 5662, a nickel base alloy. Each rail extends circumferentially about the interior of the outer case. The rails adapt the case to engage other elements of the stator assembly such as an outer air seal 28 or a stator vane assembly 30. For example, the stator vane 33 has an upstream flange 54 or foot which engages the upstream rail 48 and a downstream flange 56 or foot which extends over the downstream rail 50 and engages the downstream rail.

Each arcuate stator vane assembly includes an anti-rotation key 58 which is integral with the vane. One satisfactory material for the key is AMS 5391, a nickel base alloy. The rail has a plurality of axially extending slots which adapt the rail to engage an anti-rotation key at each stator vane and outer air seal segment as represented by the slot 60. The key is disposed in an associated slot in the rail. The key has a section which extends beyond the slot and adapts the key to engage the adjacent segment 28 of the outer air seal 26.

Each segment 28 of the outer air seal 26 has an upstream end 62 and a downstream end 64. The downstream end is trapped between the stator vane assembly 32 and the rail. The upstream end has a circumferentially extending channel 66 which faces in the axial direction and adapts the outer air seal to engage the flange or foot 56 of the vane and the rail 50.

Figure 3:
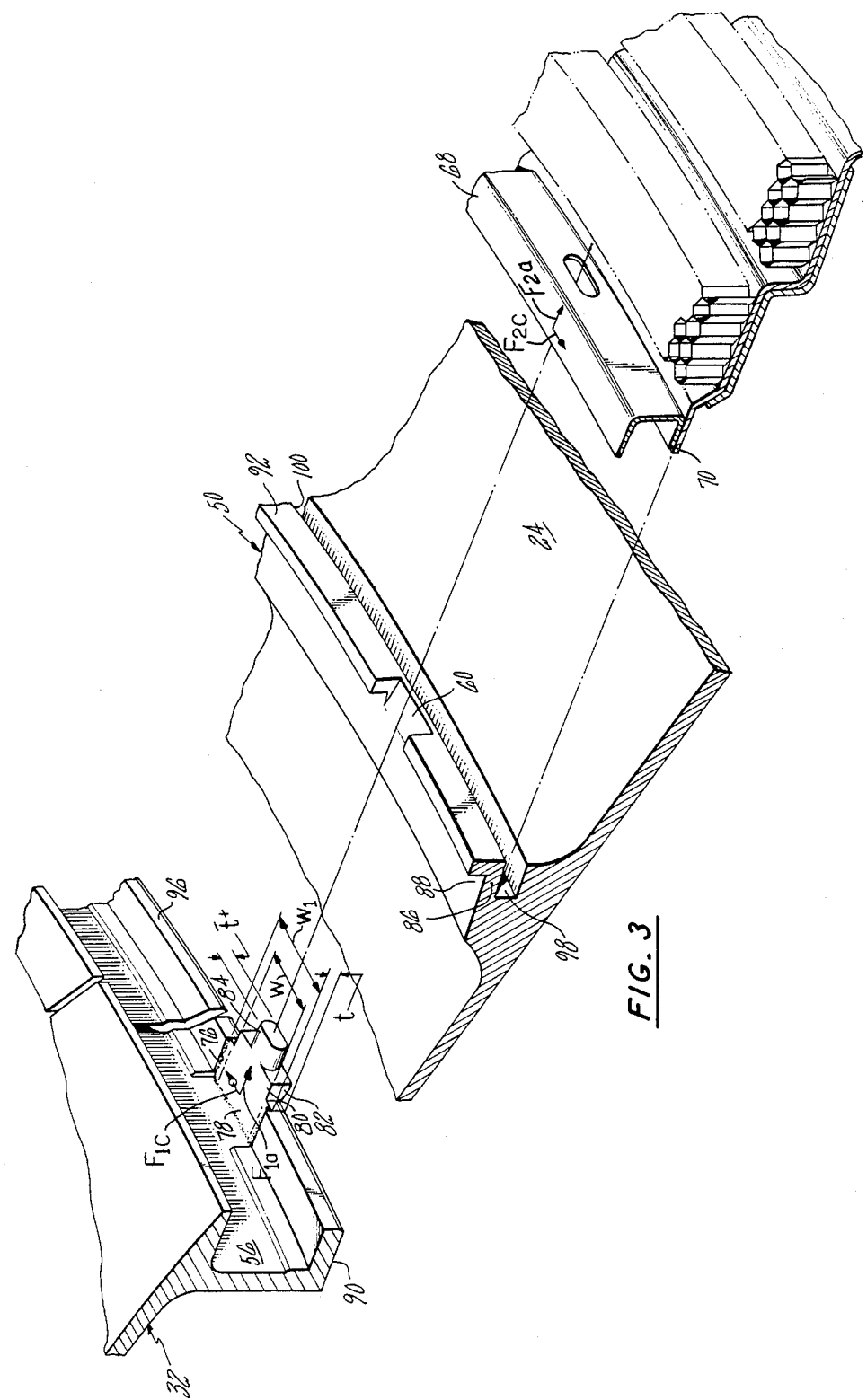
FIG. 3 is an enlarged, exploded perspective view of a section of the array of stator vanes, a section of the outer case showing a circumferentially extending rail having slots and a section of a segment of an outer air seal having an opening to receive a key which is integrally attached to the vane.

As shown in FIG. 1 and FIG. 3 which is an enlarged view of part of FIG. 1, the outer air seal segment has a pair of flanges (that is, an inner flange 68 and outer flange 70) which extend axially over the rail 50 and overlap the foot 56 on the vane. A plate 72 extending between the outer air seal flanges bounds the channel. The plate has an opening 74 which adapts the outer air seal segment 28 to receive the key 58 that is integral with the vane. The key extends through the slot 60 in the rail. The plate slidably engages the key in the axial direction and abuttingly engages the key in the circumferential direction. Thus, the downstream foot of the vane extends over the rail and forms a partial shield for the rail. The inner flange of the outer air seal extends over the lip on the rail and overlaps the vane foot to complete the shield for the rail. The outer flange of the outer air seal extends into a groove 98 in the rail to restrain the outer air seal against radial movement and the inner flange of the outer air seal radially restrains the downstream vane foot against radial movement.

Figure 2:
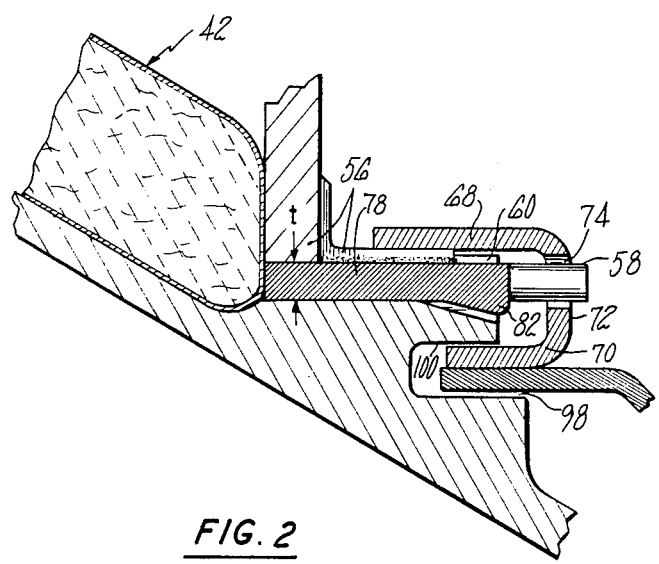
FIG. 2 is an enlarged view of a section of FIG. 1.

FIG. 3 is an exploded partial perspective view of sections of three components shown in FIG. 1. In particular, FIG. 2 shows the relationship of two vane assemblies of the array of stator vane assemblies 30 to the outer case 24 and to the downstream outer air seal 28. The stator vane has a slot 76 which adapts the vane to receive the key 58. The key 58 has a first section 78 disposed in the slot in the vane. The key is integrally attached to the vane by bonding or may be mechanically attached by a fastener. One example of bonding is brazing using a material such as Aerospace Material Specification (AMS) 4777 nickel braze material. The key has a thickness t and a circumferential width $w_1$ or a width w shown between the dotted lines.

The key 58 has a second section 80 which is disposed in the slot 60 in the rail. The second section has a width w which is the same as the width w of the first section although in some constructions the larger width $w_1$ may be used for the first section in which case the width of the second section will be smaller than the first section. The second section has a radial projection extending toward the outer case which increases the average thickness of the second section such that the average thickness $\bar{t}_+$ is greater than the thickness t of the first section. The projection 82 increases the area of the key facing in the circumferential direction and the bearing area of the key against the rail.

The key has a third section 84 having a thickness t and a circumferential width which is less than the circumferential width w. The opening in the outer air seal and the third section are sized and have rounded circumferential edges to decrease stress concentrations in the upstream end of the outer air seal segment 28.

The circumferentially extending rail 50 on the outer case 24 has a flange 86 having an inwardly facing surface 88 which adapts the rail to engage an outer surface 90 of the foot 36 of the stator vane assembly 32. The flange 86 includes an annular lip 92 which extends radially inwardly from the inwardly facing surface 88 of the flange. The lip has a radially extending surface 94 that faces axially in the upstream direction and adapts the flange 86 to engage a corresponding downstream surface 96 on the foot of the stator vane assembly. The slot which receives the second section 80 of the key 58 extends through the lip on the rail and outwardly past the surface 88 on the flange.

The flange 86 of the rail is spaced from the remaining section of the rail to form a groove 98 which extends circumferentially in the rail and faces in the downstream direction. The groove adapts the rail to receive the outer flange 70 of the outer air seal 28. An outwardly facing surface 100 on the rail bounds the groove and slidably engages the outer flange of the outer air seal.

Figure 4:
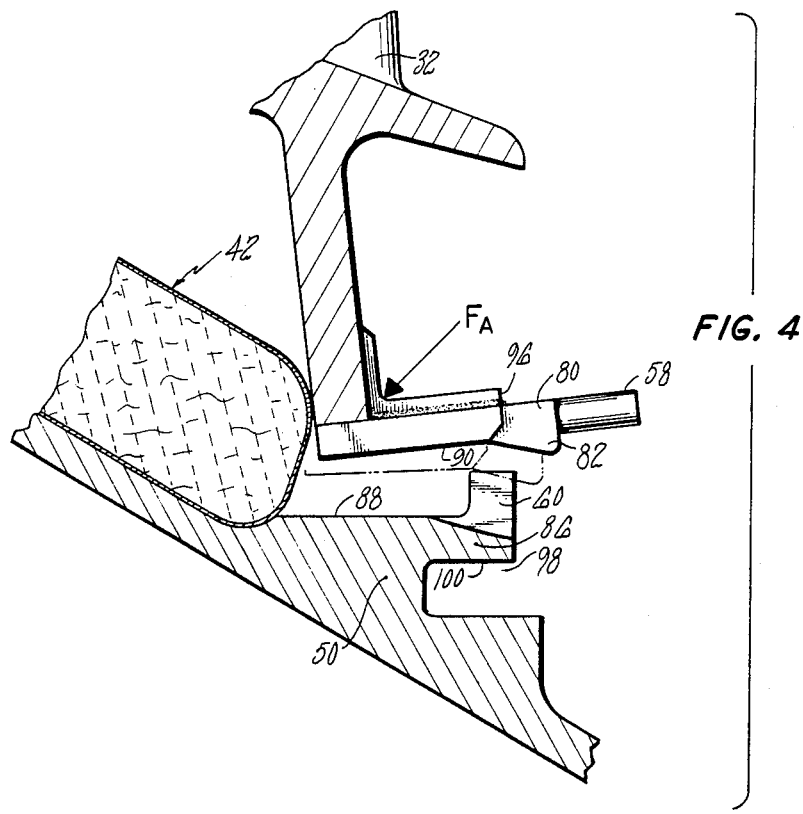
FIG. 4 is an enlarged cross-sectional view of the vane during assembly as the vane is rotated about the front section of the vane toward the casing to bring the anti-rotation key into engagement with the slot on the rail.

FIG. 1 in phantom and FIG. 4 show the relationship of the stator vane assembly 32, the rail 50 and the insulation blanket 42 during assembly of the vane to the rail. The slot 60 in the rail extends radially outwardly beyond the inwardly facing surface 88 of the flange 86. The slot has an arcuate shape due to the use of a grinding wheel to form the slot. Alternatively, the slot could have a flat, machined bottom surface. The generally triangular radial projection 82 of the key 58 is disposed in the slot in the assembled condition. The phantom line shows the approximate position of the downstream foot and key as the vane is rotated into position about the front foot (shown by dotted lines in FIG. 1) prior to installing the vane with a sharp increase in assembly force $F_A$ on the rear of the vane. As discussed below, the force acts in the axially forward and radially outward directions to snap the rear surfaces of the vane 90, 96 in position against the axially facing surface 94 of the lip and the inwardly facing surface 88 of the rail.

During assembly of the vane to the rail, the stator vane assembly 32 is rotated about the upstream foot 54 as shown in FIG. 1 until the rear foot 56 begins to press against the resilient insulation 42, compressing the insulation. The vane is rotated downwardly to the position shown in phantom where the radial projection on the key extends at least some distance into the slot to act as an alignment tool to locate the vane and the key with respect to the rail. At this point, a sudden increase in force is required to overcome friction generated at the front foot of the vane as the arcuate foot of the vane enters the arcuate groove 102 in the upstream rail 48. This frictional force results from misalignment of the arcuate surface of the foot (because the vane is at an angle as shown in phantom in FIG. 1) and the arcuate surface of the groove in the rail. The vane is driven forwardly and outwardly by the application of a sudden force $F_A$ such as through a tool employing a lever and pivoted arm or by striking a sharp blow against the rear foot of the vane with a plastic drift or like object having a resilient surface which does not mar the vane. This compresses the resilient insulation, overcomes the misalignment force and drives the vane forwardly and outwardly such that the vane snaps into place and the insulation presses the rear foot of the vane back against the axially facing surface of the rail.

During operation of the gas turbine engine shown in FIG. 1, working medium gases are flowed along the flow path for the turbine. These gases exert on the airfoil of the vane an axially rearward force $F_{1a}$ and a counterclockwise circumferential force $F_{1c}$. These forces are shown in FIG. 1 and are transmitted to the outer case through the rail as shown in FIG. 2. As the working medium gases exit the vane, the gases exert an axial force $F_{2a}$ and a circumferential force $F_{2C}$ which acts in the clockwise direction on the outer air seal when viewed from the front of the engine. Thus, the circumferential forces exerted by the vane and outer air seal act in opposite directions on the key and form a force couple $F_{1c}$–$F_{2c}$. The shearing force that is exerted by the key on the rail is reduced by these oppositely directed forces. The stator vane axial force $F_{1a}$ resists the couple because the key is integral with the vane. Thus, the torsional force resulting from the force couple $F_{1c}$–$F_{2c}$ is reduced by making the key integral with the vane such that the torsional moment or twisting force is partially reduced in comparison with constructions in which the key slidably engages both the vane and the outer air seal in the axial direction. In addition to reducing the torsional forces, the radial projection from the key increases the circumferentially facing area of the key which reduces the unit stress exerted on the rail. This increases the low cycle fatigue life of the rail. Shielding the rail against the hot gases with the outer air seal and the vane reduces thermal stresses the rail.

In addition, making the key 58 integral with the stator vane 33 (such as by forming the key as a part of the vane or forming the key separately and attaching it to the vane so it acts as a one piece construction) prevents the twisting or torsional forces from freeing the key from the slot 60 which would allow the key to move into the flow path. The reduction in shearing forces and torsional movement allows a smaller cross-sectional area to be used for the key for the same level of stresses in the rail. This reduces the mass of the key which is an advantage should a section of the key break free and enter the flow path.

During assembly, another advantage of making the key integral with the vane is that it eliminates the key as a separate part which must be assembled to the vane and to the outer air seal after the vane is installed in the engine. This reduces the number of parts required for the engine and simplifies final assembly because the key is not installed as a separate piece in the tight working area that exists inside the engine.

Although the invention has been shown and described with respect to detailed embodiments thereof, it should be understood by those skilled in the art that various changes in form and detail thereof may be made without departing from the spirit and the scope of the claimed invention.

We claim:

1. A method for assembling a stator assembly of a gas turbine engine which includes an outer case having a pair of axially spaced rails, and a stator vane assembly having a first foot facing in a first direction for engaging the first rail and a second foot facing in a second direction for engaging the second rail, the first rail having an annular groove of a first diameter for receiving the first foot, the second rail having a diameter greater than said first diameter, a flange extending axially which radially engages the second foot and a lip extending radially which axially engages the second foot, and an axially extending slot which adapts the rail to engage an antirotation key on the vane, comprising:

forming a stator vane assembly having a key integral with the second foot which extends axially from the vane and which has a projection extending radially outwardly from the key;

assembling the vane to the casing by engaging the groove with the first foot, rotating the vane about the first foot outwardly until the radial projection on the key is aligned with and projects at least some distance into the slot;

forcing the vane outwardly and axially to trap the first foot axially and radially with the first rail to seat the key in the slot and to engage the second foot axially with the lip and radially with the flange of the second rail.

2. The method of assembling a stator assembly of a gas turbine engine of claim 1 which includes disposing a resilient material between the vane feet and the outer case and compressing the resilient material as the vane is forced against the second rail.

3. An improved arcuate stator vane assembly of the type used in a gas turbine engine, the stator vane assembly having at least one radially extending airfoil wherein the improvement comprises:

a key extending axially from the vane which has a first section integral with the vane, a second section which adapts the vane to circumferentially engage a support structure to block circumferential movement of the vane, the second section having a radial projection from the key which increases the area of the key facing in the circumferential direction, and,
a third section extending from the second section of the key which adapts the key to engage an axially adjacent arcuate segment.

4. The arcuate stator vane assembly of claim 3 wherein the radial projection from the key has a cross-sectional shape which is triangular.

5. A stator assembly for an axial flow rotary machine having an axis of symmetry and an annular flow path for working medium gases disposed about the axis, which comprises:

an annular support structure having a plurality of axially extending slots facing the flow path which are spaced circumferentially one from the other about the support structure;
an annular element bounding the flow path which includes a plurality of arcuate segments having an arcuate segment at each slot, the arcuate segment including a key having a first section integral with the segment, a second section extending axially from the first section which is disposed in said slot to prevent circumferential movement and which has a radial projection extending toward the support that increases the area of the key facing in the circumferential direction.

6. The stator assembly of claim 5 wherein the annular element is a first annular element, wherein the key has a third section extending from the second section, and wherein the stator assembly further includes a second annular element bounding the flow path which is axially adjacent to the first element, the second annular element including a plurality of second arcuate segments having a second arcuate segment at each slot, the second arcuate segment at one of the slots having an opening which adapts the second arcuate segment to slidably engage the third section of the key in the axial direction and to abuttingly engage the third section of the key in the circumferential direction to block circumferential movement of the segment.

7. The stator assembly of claim 6 wherein the first annular element is an array of stator vane assemblies and the second annular element is an outer air seal.

8. A stator assembly for a gas turbine engine having an axis of symmetry $A_r$, which comprises:

an outer case extending circumferentially about the axis of symmetry $A_r$ which has a rail extending circumferentially about the interior of the case, the rail having an inwardly facing surface, a plurality of slots which extend in the axial direction and face inwardly, and, a circumferentially extending groove which adapts the rail to engage an outer air seal, the groove having a side bounded by an outwardly facing surface on the rail;
an annular array of stator vane assemblies disposed circumferentially about the interior of the case, at least one of which includes,
a stator vane having a flange which extends over the rail, and,
a key which has a first section integral with the vane, which has a second section which is disposed in the slot and which slidably engages the rail in the axial direction and which has a third section which extends beyond the slot and adapts the key to engage an outer air seal segment; and,
an annular outer air seal axially adjacent to the rail which includes a plurality of outer air seal segments, each segment having an upstream end and a downstream end, at least one of the segments having a circumferentially extending channel at one end which faces in the axial direction, the segment including a pair of radially spaced flanges which extend axially and a plate extending between the flanges to bound the channel, the plate having an opening which adapts the plate to slidably engage the third section of the key;

wherein the inner flange of the outer air seal overlaps the vane such that the vane and the outer air seal shield the rail from the working medium gases;

wherein the inner flange of the seal segment and the outer flange which extends axially over the outwardly facing surface on the rail radially trap the vane to the rail while being radially restrained by the flange of the vane and the outwardly facing surface of the rail to radially restrain the outer air seal;

wherein the rail and the key restrain the vane and the outer air seal segment against circumferential movement and wherein the integral vane and key provides an axial force which resists twisting forces circumferentially exerted on the rail through the key by the outer air seal and the vane.

9. The stator assembly for a gas turbine of claim 8 wherein the vane has a slot, wherein the first section of the key which is disposed in the slot and integrally attached to the vane has a thickness t and a circumferential width w, the second section of the key has a circumferential width which is equal to or less than w and has a radial projection extending toward the casing which increases the average thickness of the second section such that the average thickness is greater than the thickness t, and, the third section of the key has a thickness t and has a circumferential width which is less than the circumferential width w of the second section.

10. The stator assembly for a gas turbine engine of claim 9 wherein the flange of the rail has an annular lip which extends radially inwardly from the inwardly facing surface of the rail and wherein the slot in the rail extends through the lip on the rail and radially outwardly beyond the inwardly facing surface of the flange.

11. The stator assembly for a gas turbine engine of claim 9 wherein the key is bonded to the stator vane by brazing.

* * * * *